No. 697,128. Patented Apr. 8, 1902.
J. A. BOMGREN.
SUPPORT FOR STEAM TURBINE WHEELS.
(Application filed Oct. 19, 1901.)
(No Model.)
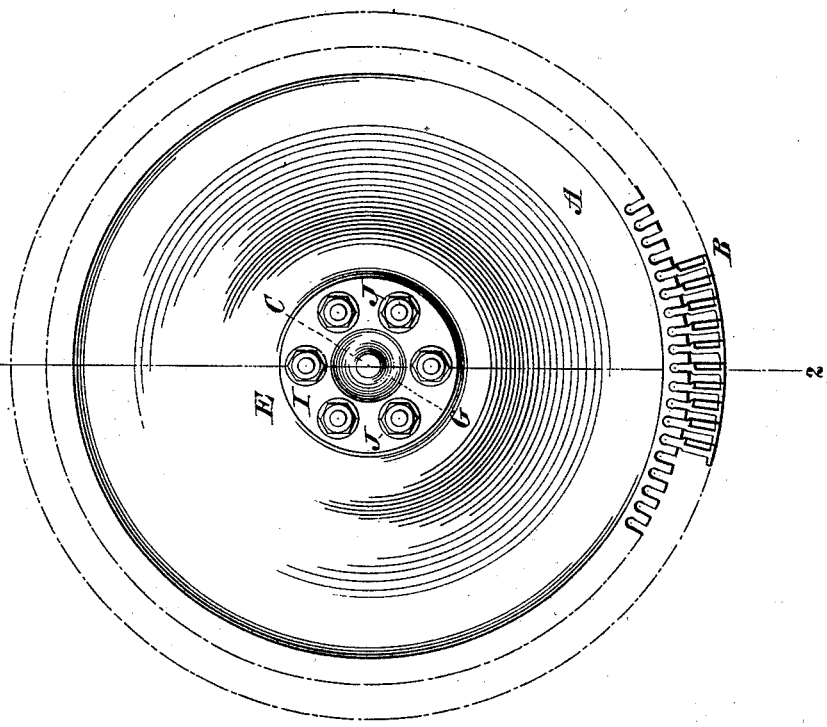
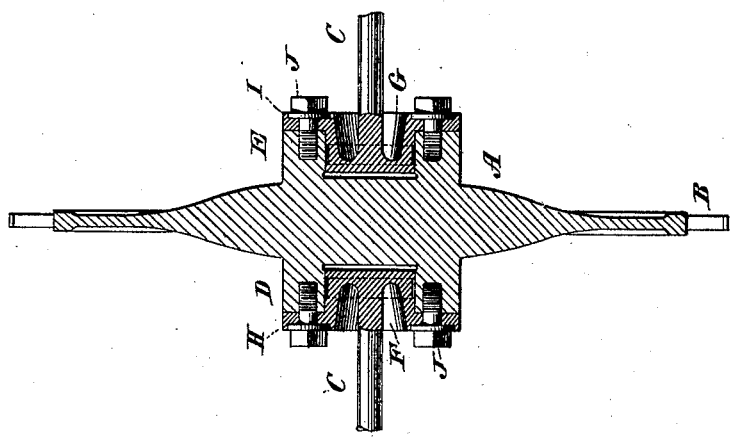
WITNESSES:
INVENTOR
Johan Axel Bomgren
BY
Park Benjamin
ATTORNEY

UNITED STATES PATENT OFFICE.

JOHAN AXEL BOMGREN, OF STOCKHOLM, SWEDEN, ASSIGNOR TO DE LAVAL STEAM TURBINE COMPANY, A CORPORATION OF NEW JERSEY.

SUPPORT FOR STEAM-TURBINE WHEELS.

SPECIFICATION forming part of Letters Patent No. 697,128, dated April 8, 1902.

Application filed October 19, 1901. Serial No. 79,189. (No model.)

*To all whom it may concern:*

Be it known that I, JOHAN AXEL BOMGREN, of Jerla, Stockholm, Sweden, have invented a new and useful Improvement in Wheel-Supports, of which the following is a specification.

The object of the invention is to provide a broad and rigid support for a wheel, especially for that class of wheels—as, for example, a steam-turbine—which is ordinarily rotated at high velocities.

The invention consists in the combination, with a wheel having sockets on opposite sides thereof, of supporting shaft-sections having enlarged end portions constructed to enter and fill said sockets and means for rigidly connecting said shaft-sections to said wheel.

In the accompanying drawings, Figure 1 is a side elevation of the wheel, and Fig. 2 is a section thereof on the line 2 2 of Fig. 1.

Similar letters of reference indicate like parts.

A is the disk or body portion of the wheel, provided with a central hub, which may be integral therewith, as shown. When the wheel is used as a steam-turbine, it is also provided on its rim with buckets B, secured in place by expansion of their shanks in radial recesses or in any other well-known manner.

In the hub D E of the wheel are formed cylindrical sockets to receive the ends of the supporting shaft-sections C. At the ends of said shaft-sections are enlargements F G, which are of sufficient diameter and length to fit within said sockets and fill or very nearly fill the same. Upon said enlarged portions are formed flanges H I, which extend over the outer faces of the hub and are secured thereto by bolts J. This construction forms a very rigid and firm support for the wheel. The shaft-sections may be readily detached by the removal of the bolts J.

I am aware that flexible shaft-sections having at their ends flanges have been combined with the body portion of a steam-turbine wheel in which are sockets adapted to receive said flanged extremities, as shown in United States Letters Patent to C. G. P. De Laval, No. 431,749, July 8, 1890; but in this construction the enlarged portions necessarily do not fill the sockets, nor are the shaft-sections rigidly secured to the wheel, it being essential in said construction to combine with the enlarged portions means as described for permitting the shaft-sections to be deflected out of line. Consequently said sections cannot have enlargements approximately equaling in depth the sockets in which they are placed; nor can said sections be rigidly secured to the wheel.

I claim—

1. The combination with a wheel having sockets on opposite sides thereof, of the supporting shaft-sections having enlarged end portions constructed to enter and fill said sockets, and means for rigidly connecting said shaft-sections to said wheel.

2. The combination with a wheel having sockets on opposite sides thereof of supporting shaft-sections having enlarged end portions F, G constructed to enter and fill said sockets, flanges H, I on said end portions, and bolts rigidly connecting said flanges to said wheel.

JOHAN AXEL BOMGREN.

Witnesses:
 WOLDEMAR BOMAN,
 I. A. VAN WART.